(12) United States Patent
Popescu et al.

(10) Patent No.: US 10,557,922 B2
(45) Date of Patent: Feb. 11, 2020

(54) HOLDING APPARATUS FOR HOLDING A DRIVE UNIT OF A DEVIATING MIRROR ARRANGEMENT, DETECTION APPARATUS HAVING A DEVIATING MIRROR ARRANGEMENT, AND MOTOR VEHICLE

(71) Applicant: VALEO Schalter und Sensoren GmbH, Bietigheim-Bissingen (DE)

(72) Inventors: Sorin Popescu, Bietigheim-Bissingen (DE); Peter Horvath, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 146 days.

(21) Appl. No.: 15/578,868

(22) PCT Filed: May 19, 2016

(86) PCT No.: PCT/EP2016/061186
§ 371 (c)(1),
(2) Date: Dec. 1, 2017

(87) PCT Pub. No.: WO2016/193001
PCT Pub. Date: Dec. 8, 2016

(65) Prior Publication Data
US 2018/0128902 A1    May 10, 2018

(30) Foreign Application Priority Data

Jun. 3, 2015   (DE) .................... 10 2015 108 762

(51) Int. Cl.
*G01S 7/481*   (2006.01)
*G01S 17/93*   (2006.01)
*G01S 17/42*   (2006.01)

(52) U.S. Cl.
CPC .......... *G01S 7/4813* (2013.01); *G01S 7/4817* (2013.01); *G01S 17/42* (2013.01); *G01S 17/936* (2013.01)

(58) Field of Classification Search
CPC ...... G01S 7/4813; G01S 7/4817; G01S 17/42; G01S 17/936; G01S 7/481; G01S 7/4811
See application file for complete search history.

(56) References Cited

U.S. PATENT DOCUMENTS 5,587,583 A * 12/1996 Chin ...................... G02B 23/12
                                                       250/332
5,745,050 A * 4/1998 Nakagawa ............... G08G 1/16
                                                        180/167

(Continued)

FOREIGN PATENT DOCUMENTS

AT         514 218 B1     5/2015
DE      100 02 090 A1     7/2001

(Continued)

OTHER PUBLICATIONS

International Search Report issued in PCT/EP2016/061186 dated Jul. 15, 2016 (2 pages).

(Continued)

*Primary Examiner* — Que Tan Le
*Assistant Examiner* — Jennifer D Bennett
(74) *Attorney, Agent, or Firm* — Osha Liang LLP (57) ABSTRACT

A holding apparatus is disclosed for holding a drive unit of a deviating mirror arrangement of an optical detection apparatus for a motor vehicle. The holding apparatus includes a holding part, with which a light barrier is formed in one piece, the light barrier being arranged. When the drive unit is being held by the holding apparatus, to subdivide a reflective surface of at least one deviating mirror, mounted rotatably on a rotation axle, of the deviating mirror arrange- (Continued)

ment into an emission region and a reception region locally on the reflective surface.

14 Claims, 3 Drawing Sheets

(56) References Cited

U.S. PATENT DOCUMENTS

| | | | | |
|---|---|---|---|---|
| 5,808,727 | A | * | 9/1998 | Katayama ............ G01S 7/4811 356/141.1 |
| 2008/0007710 | A1 | * | 1/2008 | Zambon ................ G01S 7/481 356/5.01 |
| 2010/0118363 | A1 | * | 5/2010 | Shigematsu ........... G01S 7/481 359/199.3 |
| 2014/0029075 | A1 | * | 1/2014 | Bayha .................. G01S 7/4817 359/200.7 |

FOREIGN PATENT DOCUMENTS

| | | |
|---|---|---|
| DE | 10 2008 064 652 A1 | 3/2011 |
| DE | 102010047984 A1 | 4/2012 |
| EP | 2 237 065 B1 | 2/2012 |
| EP | 2 687 865 A1 | 1/2014 |
| JP | 2011-027747 A | 2/2011 |
| JP | 2013-546009 A | 12/2013 |
| KR | 10-2013-0118864 A | 10/2013 |
| WO | 2016/096624 A1 | 6/2016 |

OTHER PUBLICATIONS

Written Opinion of the International Searching Authority issued in PCT/EP2016/061186 dated Jul. 15, 2016 (5 pages).
German Search Report issued in DE 10 2015 108 762.6 dated Mar. 17, 2016 (10 pages).
Decision of Rejection in corresponding Japanese Application No. 2017-562613, dated Mar. 26, 2019 (5 pages).
Notification of Reason for Rejection in corresponding Japanese Application No. 2017-562613, dated Nov. 13, 2018 (6 pages).
Notice of Preliminary Rejection in corresponding Korean Application No. 2017-7034768, dated Apr. 9, 2019 (15 pages).
Reason for Final Rejection in corresponding Korean Application No. 2017-7034768, dated Aug. 14, 2019 (8 pages).

* cited by examiner

HOLDING APPARATUS FOR HOLDING A DRIVE UNIT OF A DEVIATING MIRROR ARRANGEMENT, DETECTION APPARATUS HAVING A DEVIATING MIRROR ARRANGEMENT, AND MOTOR VEHICLE

BACKGROUND

The invention relates to a holding apparatus for holding a drive unit of a deviating mirror arrangement of an optical detection apparatus for a motor vehicle. The invention furthermore relates to an optical detection apparatus and to a motor vehicle.

SUMMARY

In the present case, the interest relates to an optical detection apparatus for a motor vehicle, in particular to a laser scanner. By means of the optical detection apparatus, a surrounding region of the motor vehicle can be monitored. Objects in the surrounding region of the motor vehicle can in this case be detected, and information about the detected object, for example a distance of the object from the vehicle, can be provided to a driver assistance system. Such an optical detection apparatus in the form of a laser scanner is known, for example, from DE 10 2010 047 984 A1. Light, which is provided for example by a laser, is in this case emitted onto a deviating mirror of an emission mirror unit and reflected at the deviating mirror into the surrounding region. The light is reflected back at the object in the surrounding region to a deviating mirror of a reception mirror unit, and then detected. The deviating mirrors of the emission unit and the reception mirror unit are rotatably mounted, and are driven by means of a drive unit for rotation about a rotation axle. The light is thereby deviated to different positions in the surrounding region, and the surrounding region is therefore scanned. Laser scanners conventionally have a high sensitivity, so that the surrounding region can be detected very accurately.

This high sensitivity, however, leads to the disadvantage that the laser scanner reacts sensitively to perturbing signals, for example reflections of the emitted light at entities other than the objects to be scanned, for example at housing parts of the laser scanner. In order to prevent such so-called self-interferences of the laser scanner, for example, DE 100 02 090 A1 proposes to arrange the deviation devices for the emission and reception in separate housings, in order to optically isolate the emission device and the reception device from one another.

It is an object of the present invention to provide a solution, by means of which perturbing signals of a detection apparatus can be avoided in a particularly simple and unelaborate way.

This object is achieved according to the invention by a holding apparatus, an optical detection apparatus and a motor vehicle, having the features according to the independent patent claims.

A holding apparatus according to the invention is used for holding a drive unit of a deviating mirror arrangement of an optical detection apparatus for a motor vehicle. The holding apparatus comprises a holding part, with which a light barrier is formed in one piece, the light barrier being arranged, when the drive unit is being held as intended by the holding apparatus, to temporarily subdivide a reflective surface of at least one deviating mirror, mounted rotatably on a rotation axle, of the deviating mirror arrangement into an emission region and a reception region locally on the reflective surface.

The holding apparatus is a component of the optical detection apparatus, in particular of a light scanner, which emits an optical signal provided by a light source, in particular a laser beam provided by a laser, into a surrounding region of the motor vehicle and subsequently receives the light reflected at an object in the surrounding region. The holding apparatus is in this case used to hold the drive unit, which may for example be configured as a servomotor and is configured in order to drive the rotation axle on which the at least one deviating mirror is rotatably mounted. At the same time, by virtue of the light barrier formed in one piece with the holding part of the holding apparatus, the holding apparatus is configured to subdivide the reflective surface of the at least one deviating mirror into the emission region and the reception region. The light barrier is thus integrated into the holding apparatus. The subdivision is in this case carried out in such a way that the light barrier of the holding apparatus is arranged on the reflective surface of the at least one deviating mirror. The light barrier in this case locally covers the reflective surface of the at least one deviating mirror.

Put another way, the emission region and the reception region are thus not formed as separate mirror parts, but instead are only formed after the light barrier has been arranged on the uninterrupted, continuous, reflective surface of the at least one deviating mirror. The light barrier may in this case be nondestructively separated again from the reflective surface. In other words, this means that the subdivision of the reflective surface into the emission region and the reception region is removed again after separation of the light barrier from the reflective surface, i.e. an uninterrupted, continuous, reflective surface without the emission region and the reception region is provided again after separation. The holding apparatus having the holding part and the light barrier is in this case static with respect to the at least one rotatably mounted deviating mirror. This means that, by the rotation of the deviating mirror, the reflective surface of the deviating mirror is removed from the static light barrier, in particular rotated away under the light barrier. In this way, the reflective surface of the at least one deviating mirror is thus only transitorily, or temporarily, subdivided into the emission region and the reception region. The subdivision of the reflective surface into the emission region and the reception region thus takes place only when the reflective surface of the at least one deviating mirror overlaps with the light barrier in a current setting, or rotational position, and the light barrier is thereby arranged on the reflective surface. The holding apparatus is thereby configured to be particularly multifunctional. In this way, the at least one deviating mirror can be subdivided in a particularly straightforward way into the emission region and the reception region.

The one-piece configuration of the holding part with the light barrier furthermore leads to the advantage that, for example, no light gaps, by which scattered light and therefore signal perturbation might be caused, are formed between the holding part and the light barrier. An improved signal-to-noise ratio of the detection apparatus is thereby achieved, which leads to a range increase of the detection apparatus. Furthermore, by the reduction of the number of components and mounting steps, costs for the production of the optical detection apparatus can be reduced.

Particularly preferably, the light barrier comprises an aperture window through which a region of the reflective surface is exposed, or made optically accessible, when the light barrier is arranged on the reflective surface, the emission region being formed by the region exposed by the aperture window and the reception region being formed as a region of the reflective surface adjacent to the light barrier. The aperture window may, for example, be formed in the holding part as a through-hole. The light barrier is in this case arranged on the reflective surface in such a way that the aperture window overlaps with the reflective surface. In a direction of view of the reflective surface perpendicular to the reflective surface, the exposed region of the reflective surface, which is defined as the emission region, is visible through the aperture window. During the rotation of the deviating mirror, a surface of the overlap region, and therefore of the emission region, varies.

The light barrier thus functions as a stop with a fixed stop aperture in the form of the aperture window. The optical signal provided by the light source is thus emitted through the stop aperture, i.e. through the aperture window, onto the emission region of the reflective surface of the at least one deviating mirror, and reflected back from the reflective surface of the emission region through the stop aperture into the surrounding region. The region adjacent to the light barrier, i.e. a region outside the aperture window as well as a region of the reflective surface not covered by components of the light barrier, for example a border of the aperture window, is therefore defined as the reception region. By the provision of the aperture window, for example in the holding part, the light barrier can be manufactured particularly simply and unelaborately.

Preferably, the aperture window is formed with a width which corresponds at least to a width of the reflective surface. The light barrier is thus configured for horizontal subdivision of the reflective surface into the emission region and the reception region along a rotation axle, oriented in vertical direction, of the deviating mirror arrangement. By the light barrier, the reflective surface of the at least one deviating mirror is thus subdivided into two regions horizontally adjacent to one another. The drive unit and the at least one rotatably mounted deviating mirror are arranged above one another along the rotation axle. In particular, the light barrier is arranged in the region of a width edge, adjacent to the drive unit and next to the drive unit, of the at least one deviating mirror. In this way, the emission region is arranged next to the drive unit. In one consideration of the detection apparatus, in which the detection apparatus is oriented in such a way that the drive unit is arranged above the at least one deviating mirror along the vertically extending rotation axle, the emission region is in this case the upper region on the reflective surface and the reception region is the lower region lying below the emission region on the reflective surface.

Preferably, the aperture window is formed along the rotation axle with a height which is less than half the height of the reflective surface. The light barrier is thus configured for subdivision of the reflective surface into a reception region which is larger than the emission region. Along the rotation axle, the emission region thus has a smaller height, or a smaller vertical aperture, than the reception region. The aperture window may, for example, be configured as a narrow strip in the holding part over a width of the reflective surface. The reception region is thus formed with a particularly large area, so that the detection apparatus can be formed with a particularly high sensitivity by means of the holding apparatus.

Provision may be made that the light barrier has a reception device for receiving a light source and for guiding the light provided by the light source onto the emission region of the reflective surface. The reception device is in this case used for holding the light source, in particular the laser, in a defined position. The laser beam emitted by the laser can therefore be guided particularly securely and reliably from the laser via the reception device or the aperture window onto the emission region.

Preferably, the reception device comprises two walls in the shape of a spherical cap, which extend parallel to one another, form a reception shaft, and are arranged on a side wall of the holding apparatus extending parallel to the rotation axle oriented perpendicularly to the side wall. In particular, the walls are arranged adjacent to two long sides, extending along a width of the reflective surface, of the aperture window. The walls are in this case arranged perpendicularly to the side wall and therefore perpendicularly to the rotation axle of the holding apparatus. The walls in this case form a shaft, which on the one hand holds the light source and on the other hand guides the light along the shaft to the aperture window. By the walls perpendicularly adjacent to the horizontal extending long sides of the aperture window, furthermore, a particularly clear boundary is formed between the emission region and the reception region on the reflective surface. Specifically, one wall delimits the emission region downwards along the rotation axle, and the other wall arranged parallel delimits the emission region upwards along the rotation axle. By the reception device, the emission region is thus also optically isolated, or separated, particularly well from the reception region. It is therefore possible, for example, to ensure that the optical signal provided by the light source strikes only the emission region, and not the reception region, during emission.

According to one embodiment of the invention, the holding part comprises a first reception region for receiving the drive unit and a second reception region for receiving the at least one deviating mirror, the rotation axle being arranged inside the first and second reception regions, and the first and second reception regions being formed adjacent to one another along the rotation axle. The first reception region and the second reception region are thus arranged flush with one another, the drive unit being arranged above the at least one deviating mirror as viewed in the vertical direction along the rotation axle. The deviating mirror arrangement may for example comprise a carrier plate, on which two deviating mirrors are arranged opposite and parallel to one another and which is connected to the rotation axle for rotating the deviating mirror. The carrier plate with the deviating mirrors is in this case received by the second reception part when the drive unit is being held.

Preferably, the first and second reception parts are configured in the shape of a hollow cylinder, a side wall of the first reception part being formed extending around the rotation axle and directly adjacent to the light barrier, and a side wall of the second reception part comprising along the rotation axle a first region extending around the rotation axle and directly adjacent to the light barrier and an interrupted second region extending partially around the rotation axle for covering the reflective surface of the at least one deviating mirror. The hollow cylindrical reception parts are thus arranged flush with one another, the first reception part preferably having a smaller internal radius than the second reception part. The rotation axle in this case extends in particular centrally through the hollow cylindrical reception parts. By means of the first reception part, the drive unit can be received and, for example, fastened on the side wall of the first reception part for holding. The second hollow cylindrical reception part is formed continuously adjacent to the hollow cylindrical first reception part. In this case, in the first region the side wall of the second reception part is formed extending around the rotation axle and immediately adjacent to the light barrier. In the second region, the side wall of the second reception part has a recess extending along the rotation axle. By the recess, the side wall is interrupted in the second region. The side wall is in this case formed fully overlapping with the deviating mirrors in the second region of the second reception part along the rotation axle, and locally overlapping with the deviating mirrors along the circumferential direction. When the drive unit is being held, the partially circumferential side wall thus encloses the deviating mirror locally along the circumferential direction.

Provision may in this case be made that the light barrier is formed on a first side of the first reception part and of the first region of the second reception part, and the partially circumferential region of the side wall is formed on a second side, lying opposite the first side, of the first reception part and of the first region of the second reception part. In the case of two mutually opposite deviating mirrors, for example fastened on a carrier plate, this means that the reflective surface of one of the deviating mirrors is subdivided by the light barrier into the emission region and the reception region, and the reflective surface of the deviating mirror lying opposite is covered by the side wall, extending in particular semicircularly around the rotation axle, of the second region of the second reception part. In an intended installation position of the detection apparatus in the motor vehicle, the first side with the light barrier forms a front side of the detection apparatus, which faces towards a surrounding region of the motor vehicle, and the second side with the semi-cylindrical sidewall forms a rear side of the detection apparatus, which faces away from the surrounding region of the motor vehicle.

It has been found advantageous for a shape of the light barrier along a circumferential direction extending around the rotation axle to be at least locally configured complementarily with a shape of the side walls of the reception part, and thus to be formed in the side walls so as to follow a profile of the side walls. The light barrier, in particular walls of the reception device of the light barrier, may thus be configured to be locally concavely curved on the for example hollow cylindrical reception part, the side wall of which is configured to be convexly curved, so that the light barrier, in particular the walls of the reception device, join, or fit, at least locally onto the side walls of the reception parts. The light barrier is thereby integrated particularly compactly into the holding apparatus.

According to one embodiment, at least one fastening element for fastening the drive unit and/or the at least one deviating mirror, and/or the holding apparatus in a housing for the deviating mirror arrangement is formed on side walls of the holding apparatus. The at least one fastening element may, for example, be formed as a screw thread and in one piece with the holding part, by which screw thread the drive unit and/or the at least one deviating mirror and/or the holding apparatus can be fastened, or fixed, by means of screws.

Particularly preferably, the holding apparatus is formed from a light metal or a plastic. As the light metal, aluminium may for example be provided. A holding apparatus formed from plastic may, for example, be produced by means of an injection-moulding method. A holding apparatus consisting of light metal or plastic advantageously has a particularly low weight.

The invention furthermore relates to an optical detection apparatus, in particular a laser scanner, for a motor vehicle, having a deviating mirror arrangement with a drive unit for driving at least one deviating mirror, mounted rotatably on a rotation axle, of the deviating mirror arrangement, and having a holding apparatus according to the invention. The detection apparatus is used, in particular, for detecting the surrounding region of the motor vehicle.

According to one embodiment, a first region assigned to the emission region on the reflective surface of the at least one deviating mirror may have a first width, and a second region assigned to the reception region on the reflective surface of the at least one deviating mirror may have a second width, which is larger than the first width. In this case, provision may also be made for the reflective surface to be configured trapezoidally in the first region and rectangularly in the second region. The second region in this case has the second width, which narrows to the first width inside the trapezoidal first region. By virtue of this reduced first width in the region of the emission region, the light barrier can be arranged particularly close to the reflective surface, without thereby interfering with, or impeding, a rotational movement of the at least one deviating mirror around the rotation axle.

The invention also comprises a motor vehicle having an optical detection apparatus. The motor vehicle is, in particular, configured as a motorcar. The motor vehicle may for example have a driver assistance system, which provides piloted driving for the motor vehicle. The information about the surroundings which is required for the piloted driving may be determined particularly accurately with the aid of the detection of the surroundings by the detection apparatus.

The preferred embodiments proposed in relation to the holding apparatus according to the invention, and their advantages, also apply correspondingly for the optical detection apparatus according to the invention and for the motor vehicle according to the invention.

The indications "up", "down", "front", "back", "horizontal", "vertical", "radial", "inner", "outer", "rotation axle" (9), "circumferential direction" (12), etc. are used to specify positions and orientations existing during intended use and intended arrangement of the drive unit and of the deviating mirror on the holding apparatus and in the case of an observer then standing in front of the detection apparatus and looking in the direction of the detection apparatus.

Further features of the invention may be found from the claims, the figures and the description of the figures. The features and feature combinations mentioned above in the description, as well as features and feature combinations mentioned below in the description of the figures and/or merely shown in the figures may be used not only in the combination respectively indicated, but also in other combinations or separately, without departing from the scope of the invention. Embodiments of the invention which are not explicitly shown and explained in the figures, but result and may be produced from separate feature combinations from the embodiments explained, are therefore also to be regarded as comprised and disclosed by the invention. Embodiments and feature combinations which do not contain all features of an originally formulated independent claim are also to be regarded as disclosed.

BRIEF DESCRIPTION OF THE DRAWINGS

The invention will now be explained in more detail below with the aid of a preferred exemplary embodiment, and with reference to the appended drawings, in which.

In the figures, elements which are the same and the equivalent are provided with the same references.

DETAILED DESCRIPTION

Figure 1:
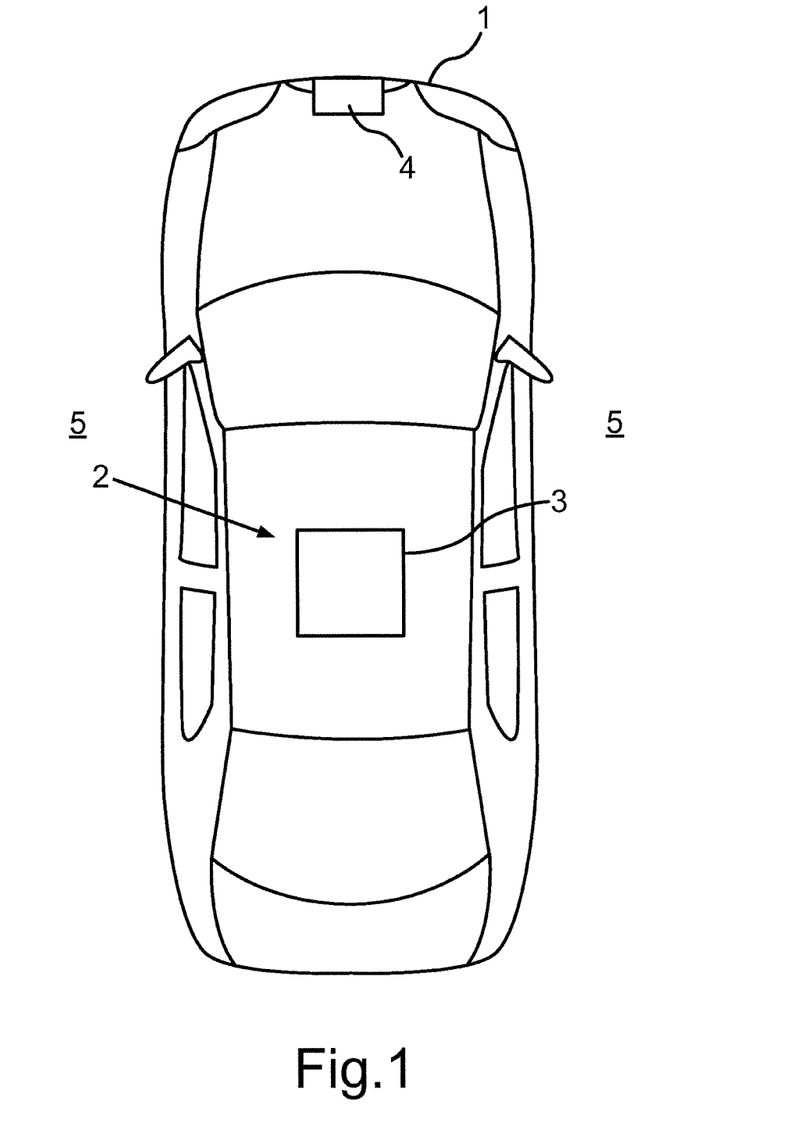
FIG. 1 shows a schematic representation of one embodiment of a motor vehicle according to the invention.

FIG. 1 shows a motor vehicle 1 according to one embodiment of the present invention. The motor vehicle 1 is configured in the present case as a motorcar. The motor vehicle 1 has a driver assistance system 2, which in turn comprises a control device 3, which may for example be formed by an electronic controller of the motor vehicle 1. The driver assistance system 2 furthermore comprises at least one optical detection apparatus 4.

The optical detection apparatus 4 is configured, in particular, as a laser scanner. In the optical detection apparatus 4, in order to monitor a surrounding region 5 of the motor vehicle 1, an optical signal provided by a light source, in particular a laser beam provided by a laser of the detection apparatus 4, is emitted into the surrounding region 5 and the signal reflected at an object in the surrounding region 5 is in turn received. Information about the object, for example a distance of the object from the motor vehicle 1, may be provided to the driver assistance system 2.

Figure 2:
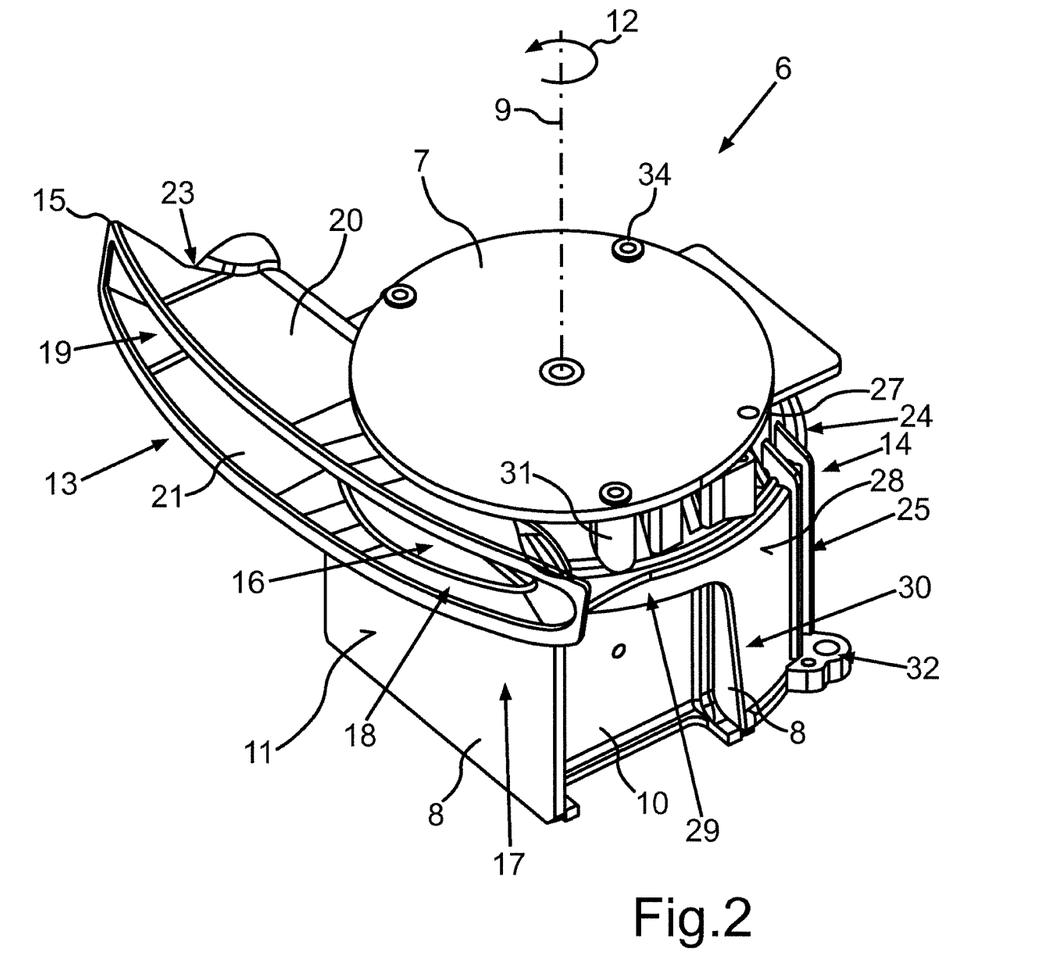
FIG. 2 shows a schematic representation of one embodiment of a deviating mirror arrangement of an optical detection apparatus according to the invention.
Figure 3:
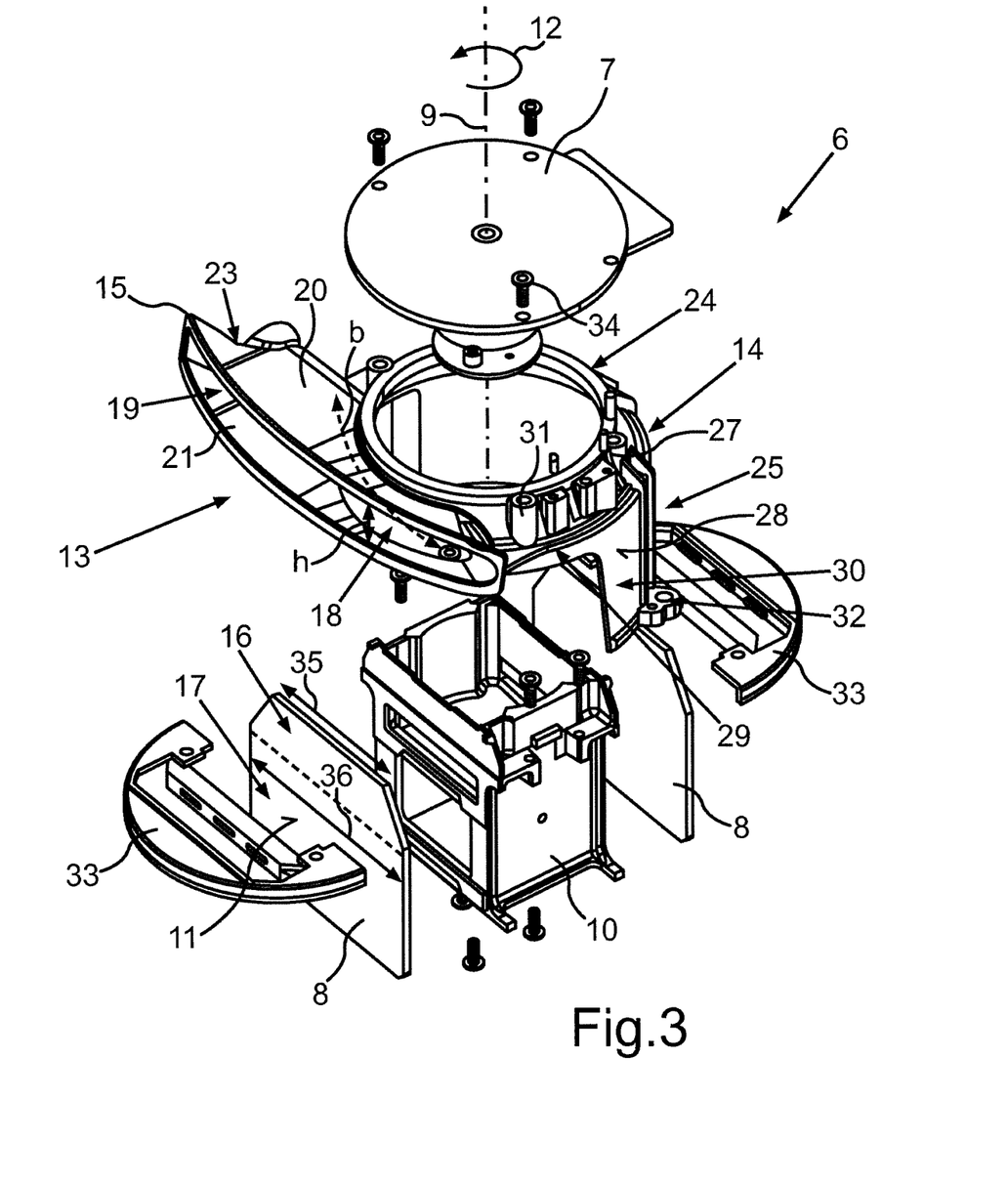
FIG. 3 shows an exploded representation of the deviating mirror arrangement shown in FIG. 2.

In order to steer the laser beam and therefore to scan the surrounding region 5, the optical detection apparatus 4 comprises a deviating mirror arrangement 6, which is shown in FIG. 2 in an assembled state and in FIG. 3 in an exploded representation. The deviating mirror arrangement 6 comprises a drive unit 7, for example in the form of a servomotor. The drive unit 7 is configured in order to drive at least one deviating mirror 8 mounted rotatably about a rotation axle 9. Here, the deviating mirror arrangement 6 comprises two deviating mirrors 8, which are arranged on a carrier device 10, for example a carrier plate, spaced apart parallel to one another and lying opposite one another. The rotatably mounted deviating mirrors 8 each have an uninterrupted continuous reflective surface 11, on which the laser beam, or the light beam, can be reflected into the surrounding region 5 or onto a reception device (not shown here) of the detection apparatus 4. The carrier device 10, and therefore the deviating mirrors 8, are rotated by the drive unit 7 about the rotation axle 9. To this end, the drive unit 7 is coupled to the carrier device 10. The deviating mirrors 8 move along a circumferential direction 12 around the rotation axle 9. The drive unit 7 is in this case arranged above the deviating mirrors 8 as viewed in the vertical direction along the rotation axle 9. Between the deviating mirrors 8 and the drive unit 7, a cover device 33, which is shown in the exploded representation according to FIG. 3, may for example be provided in this case.

The deviating mirror arrangement 6 furthermore comprises a holding apparatus 13 which is configured in order to hold the drive unit 7. The holding apparatus 13 has a holding part 14, with which a light barrier 15 is formed in one piece. When the drive unit 7 is being held, the light barrier 15 is arranged locally on the reflective surface 11 of one of the deviating mirrors 8, and therefore subdivides the reflective surface 11 of the deviating mirror 8 into an emission region 16 and a reception region 17. In this case, a region assigned to the emission region 16 on the reflective surface 11 has a first width 35, and a region assigned to the reception region 17 on the reflective surface 11 has a second width 36, which is greater than the first width 35. During intended operation of the detection apparatus 4, the light beam is in this case guided onto the emission region 16 and reflected by the emission region 16 into the surrounding region 5. The light beam is then reflected back at an object in the surrounding region 5 onto the reception region 17, and forwarded from there, for example, onto the reception device of the detection apparatus 4. The holding apparatus 15 with the holding part 14 and the light barrier 15 is in this case static relative to the rotatably mounted deviating mirror 8. Put another way, the deviating mirrors 8 rotate away under the light barrier 15, so that the reflective surface 11 of one of the deviating mirrors 8 in each case is only transitorily, or temporarily, subdivided into the emission region 16 and the reception region 17. Because the region assigned to the emission region 16 has the first width 35, the light barrier 15 can be arranged particularly compactly and close to the reflective surface 11, without a rotational movement of the deviating mirrors 8 being interfered with.

The light barrier 15 is configured here in the form of a stop, and preferably comprises an aperture window 18 as a stop aperture. When the light barrier 15 is arranged on the reflective surface 11 of the deviating mirror 8, the aperture window 18 exposes a region on the reflective surface 11. This exposed region is in this case the emission region 16. The region adjacent to the light barrier 15, i.e. the region on the reflective surface 11 which is not covered by the light barrier 15, in this case forms the reception region 17. The aperture window 18 is in this case formed with a width b, by which the reflective surface 11 is subdivided in the horizontal direction. The emission region 16 thus lies above the reception region 17 in the vertical direction. Furthermore, the aperture window 18 is formed with a height h which corresponds at most to half the height of the reflective surface 11 along the rotation axle 9. A lower emission region 16, which is smaller than the reception region 17, is thereby formed. During intended operation of the detection apparatus 4, the light beam is guided through the aperture window 18 onto the emission region 16, and reflected by the emission region 16 back through the aperture window 18 into the surrounding region 5. The light beam is then reflected at an object in the surrounding region 5 onto the reception region 17 outside the light barrier 15, and forwarded from there, for example, onto the reception device of the detection apparatus 4.

Furthermore, the light barrier 15 has a reception device 19 which is configured in order to hold the light source (not shown here), i.e. the laser, and to guide the light beam provided by the light source onto the emission region 16. Here, the reception device 19 of the light barrier 15 has two walls 20, 21 extending parallel to one another and forming a reception shaft. In this case, the laser is arranged on a shaft entry 23 of the reception device 19 and held there. The walls 20, 21 in this case extend perpendicularly to the rotation axle 9, the wall 20 delimiting the light barrier 15, and therefore the emission region 16, upwards, and the wall 21 delimiting the light barrier 15, and therefore the emission region 16, downwards. The light beam is in this case guided along the walls 20, 21 between the walls 20, 21 onto the emission region 16. The reception region 17 is formed downwards adjacent to the wall 21. By the reception device 19, in particular the walls 20, 21 of the reception device 19, the emission region 16 is separated, or optically isolated, from the reception region 17.

The holding part 14 comprises a first reception part 24 and a second reception part 25. The reception parts 24, 25 are arranged above one another in the vertical direction along the rotation axle 9 and flush with one another, the rotation axle 9 extending inside the first reception part 24 and the second reception part 25. Here, the reception parts 24, 25 are configured in the shape of a hollow cylinder. The first reception part 24 is used to receive the drive unit 7 of the deviating mirror arrangement 6. The first reception part 24 in this case has a side wall 27, which extends along the circumferential direction 12 and is directly adjacent to the light barrier 15.

The second reception part 25, which comprises a side wall 28 locally interrupted in the circumferential direction 12, is formed adjacent to the first reception part 24. The second reception part 25 is used to receive the carrier device 10 with the deviating mirrors 8. In this case, the side wall 28 is formed extending around the rotation axle 9 and directly adjacent to the light barrier 15 in a first region 29 of the second reception part 25, and is configured to be interrupted and partially circumferential in a second region 30 of the second reception part 25. The side wall 28 thus extends semicircularly around the rotation axle 9 in the second region 30. In the second region 30, the side wall 28 of the second reception part 25 is formed fully overlapping with the deviating mirrors 8 along the rotation axle 9, and locally overlapping along the circumferential direction 12. The side wall 28 is used to cover the reflective surface 11 of one of the deviating mirrors 8. The light barrier 15 is in this case formed on a first side of the reception parts 24, 25, and the side wall 28 extending semi-cylindrically in the second region 30 is formed on a second side, lying opposite the first side, of the reception parts 24, 25. During the rotation of the deviating mirrors 8, the reflective surface 11 of one of the deviating mirrors 8 is therefore subdivided by the light barrier 15 into the emission region 16 and the reception region 17, and the reflective surface 11 of the other deviating mirror 8 is covered by the side wall 28 of the second region 30 of the second reception part 25. In an intended installation position of the detection apparatus 4, the first side, comprising the light barrier 15, of the holding part 14 forms a front side, facing towards the surrounding region 5, of the detection apparatus 4, and the opposite second side, comprising the semi-cylindrically extending side wall 28, forms a rear side, facing away from the surrounding region 5, of the detection apparatus 4.

The light barrier 15, in particular the walls 20, 21 of the reception device 19, is in this case at least locally configured with a shape which follows the shape of the side walls 27, 28. Since the side walls 27, 28 are convexly curved here, a concave curvature, or recess, is formed in the walls 20, 21, by which the walls 20, 21 fit, or join, onto the side walls 27, 28. Here, the aperture window 18 is formed in the side wall 27 of the first reception part 24 and in the side wall 28 of the first region 29 of the second reception part 25.

Furthermore, fastening elements 31, 32 are formed on the holding apparatus 13, which may for example be configured as a screw thread for screws 34. On the fastening elements 31, which are formed here in the side wall 27 and therefore in one piece with the holding part 14, the drive unit 7 may for example be fastened by means of the screws 34. By means of the fastening element 32, the deviating mirror arrangement 6 may be fastened in a housing for the deviating mirror arrangement 6, or the detection device 4.

The invention claimed is:

1. A holding apparatus for holding a drive unit of a deviating mirror arrangement of an optical detection apparatus for a motor vehicle, comprising:
    a holding part, with which a light barrier is formed in one piece,
    the light barrier being arranged, when the drive unit is being held by the holding apparatus, to subdivide a reflective surface of at least one deviating mirror, mounted rotatably on a rotation axle, of the deviating mirror arrangement into an emission region and a reception region locally on the reflective surface,
    wherein the light barrier has a reception device for receiving a light source and for guiding the light provided by the light source onto the emission region of the reflective surface.

2. The holding apparatus according to claim 1, wherein the light barrier comprises an aperture window through which a region of the reflective surface is exposed when the light barrier is arranged on the reflective surface, the emission region being formed by the region exposed by the aperture window and the reception region being formed as a region of the reflective surface adjacent to the light barrier.

3. The holding apparatus according to claim 2, wherein the aperture window is formed with a width which corresponds at least to a width of the reflective surface, and the light barrier is configured for horizontal subdivision of the reflective surface into the emission region and the reception region along a rotation axle, oriented in vertical direction, of the deviating mirror arrangement.

4. The holding apparatus according to claim 2, wherein the aperture window is formed with a height which is less than half the height of the reflective surface, and the light barrier is configured for subdivision of the reflective surface into a reception region which is larger than the emission region.

5. The holding apparatus according to claim 1, wherein the reception device comprises two walls, which extend parallel to one another, form a reception shaft, and are arranged oriented perpendicularly to the rotation axle on a side wall, extending parallel to the rotation axle, of the holding apparatus.

6. The holding apparatus according to claim 1, wherein the holding part comprises a first reception part for receiving the drive unit and a second reception part for receiving the at least one deviating mirror, the rotation axle being arranged inside the first and second reception parts, and the first and second reception parts being formed adjacent to one another along the rotation axle.

7. The holding apparatus according to claim 6, wherein the first and second reception parts are configured in the shape of a hollow cylinder, a side wall of the first reception part being formed directly adjacent to the light barrier along a circumferential direction oriented around the rotation axle, and a side wall of the second reception part comprising along the rotation axle a first region extending along the circumferential direction and directly adjacent to the light barrier and a second region, interrupted along the circumferential direction, for covering the reflective surface of the at least one deviating mirror.

8. The holding apparatus according to claim 7, wherein the light barrier is formed on a first side of the reception parts, and the interrupted second region of the side wall of the second reception part is formed on a second side, lying opposite the first side, of the reception parts.

9. The holding apparatus according to claim 7, wherein a shape of the light barrier along a circumferential direction is at least locally configured complementarily with a shape of the side walls of the reception parts, and is thus formed on the side walls so as to follow a profile of the side walls.

10. The holding apparatus according to claim 1, wherein at least one fastening element for fastening the drive unit and/or the deviating mirror, and/or for fastening the deviating mirror arrangement in a housing is formed on side walls of the holding apparatus.

11. The holding apparatus according to claim 1, wherein the holding apparatus is formed from a light metal or a plastic.

12. An optical detection apparatus for a motor vehicle, comprising:
- a deviating mirror arrangement;
- a drive unit for driving a deviating mirror, mounted rotatably on a rotation axle, of the deviating mirror arrangement; and
- a holding apparatus for holding the drive unit of the deviating mirror, comprising:
  - a holding part, with which a light barrier is formed in one piece,
  - the light barrier being arranged, when the drive unit is being held by the holding apparatus, to subdivide a reflective surface of at least one deviating mirror, mounted rotatably on a rotation axle, of the deviating mirror arrangement into an emission region and a reception region locally on the reflective surface,
  - wherein the light barrier has a reception device for receiving a light source and for guiding the light provided by the light source onto the emission region of the reflective surface,
- wherein the optical detection apparatus is a laser scanner.

13. The optical detection apparatus according to claim 12, wherein a first region assigned to the emission region on a reflective surface of the at least one deviating mirror has a first width, and a second region assigned to the reception region on the reflective surface of the at least one deviating mirror has a second width, which is larger than the first width.

14. A motor vehicle having an optical detection apparatus, comprising:
- a deviating mirror arrangement;
- a drive unit for driving a deviating mirror, mounted rotatably on a rotation axle, of the deviating mirror arrangement; and
- a holding apparatus for holding the drive unit of the deviating mirror, comprising:
  - a holding part, with which a light barrier is formed in one piece,
  - the light barrier being arranged, when the drive unit is being held by the holding apparatus, to subdivide a reflective surface of at least one deviating mirror, mounted rotatably on a rotation axle, of the deviating mirror arrangement into an emission region and a reception region locally on the reflective surface,
  - wherein the light barrier has a reception device for receiving a light source and for guiding the light provided by the light source onto the emission region of the reflective surface,
- wherein the optical detection apparatus is a laser scanner.

* * * * *